Patented Apr. 27, 1954

2,676,949

UNITED STATES PATENT OFFICE 2,676,949

COPOLYMERS OF MALEIC ANHYDRIDE AND N-VINYL LACTAMS

Richard R. Morner, Dayton, Ohio, and Raymond I. Longley, Jr., Springfield, Mass., assignors to Monsanto Chemical Company, St. Louis, Mo., a corporation of Delaware No Drawing. Application February 8, 1952, Serial No. 270,753

3 Claims. (Cl. 260—78.5)

The present invention relates to new heteropolymers of maleic anhydride possessing utility as additives to soils for the purpose of improving the physical structures thereof.

We have found that valuable polymerization products may be obtained by polymerizing maleic anhydride in admixture with an N-substituted lactam, e. g., N-vinyl-2-piperidone, N-vinyl-2-pyrrolidone, N-vinyl-3,3-dimethylpyrrolidone, N-vinyl-6-caprolactam, N-vinyl-5-methyl-2-pyrrolidone, the N-vinyl-substituted lactam of 1-amino-8-naphthalenecarboxylic acid, etc.

The present products are partially water-soluble, solid polyelectrolytes. While the various copolymers may be advantageously employed for a variety of industrial purposes, e. g., as lubricant additives, textile-sizing agents, etc., they are particularly valuable as soil structure improving agents.

The ultimate utility and the beneficial properties of top soils and soils of sub-surface strata depend substantially upon the physical structure of that soil. Although most soils have a fine state of sub-division necessary for the growth of plants, many do not have other physical properties which enable the proper growth and development of the plant structures and the proper performance of the various plants functions. In addition to the plant nutrients a soil must have a continuous supply of both air and moisture. Soils of poor structure may become water-logged during wet season, which state excludes the air necessary for optimum growth and development of the plant. Soils of poor structure may lose moisture too rapidly by evaporation from the surface due to excessive capillary action, and plants growing therein will be deprived of the required continuous and abundant supply of moisture. The latter effect becomes excessive in closely compacted soils where also the growth of roots and stems are retarded due to unfavorable growing conditions. Soils of poor structure frequently experience poor germination of seeds planted therein due to the lack of either air or moisture required for normal germination.

It is also well-known that soils of poor structure are subject to erosion, because when subjected to rainfall they soon become saturated and the excess moisture flows across the surface of the soil or in a confined channel. This surface water washes away the fine soil particles and results in the displacement of large quantities of valuable soils. The quantity of surface water is increased both by the failure of the soil to absorb surface water and by the failure of the soil to provide a medium for transferring the water to underlying bodies of soil or to natural water courses.

The present invention provides new synthetic additives which, when added to soils, quickly develop the physical structure thereof. The agricultural yield of the treated soils, and particularly the soils of poor normal structure is thereby increased. Erosion susceptibility of the soils is decreased, and development of suitable cover crops facilitated by addition of small amounts of the present heteropolymers to exposed soil surfaces.

In preparing the present maleic anhydride N-vinyl lactam heteropolymers, the two monomers are mixed together and the mixture is then polymerized by heat and/or catalyst to yield the heteropolymers. The monomers react in approximately 1:1 ratio regardless of the initial proportion of monomers used. If either monomer is present in the reaction mixture in appreciable excess of a 1:1 molar ratio, the excess may be recovered nearly quantitatively. For the production of homogenous, powdery heteropolymers of particular utility as soil additives, we prefer to employ monomeric mixtures of maleic anhydride and N-vinyl lactam in which mixtures the N-vinyl lactam content is somewhat in excess of the maleic anhydride.

The present copolymers may be produced either by the mass, solution or "solvent-nonsolvent" polymerization methods. The copolymerization may be made to take place either in the absence of a catalyst or in the presence of a catalyst of polymerization, e. g., an oxygen yielding compound such as benzoyl peroxide, tert-butyl hydroperoxide, hydrogen peroxide, alkali metal or ammonium salts of peroxy acids such as sodium perborate or ammonium persulfate, etc. Particularly valuable polymerization catalysts are the azo type catalysts, e. g., $\alpha,\alpha'$-azodiisobutyronitrile, dimethyl $\alpha,\alpha'$-azodiisovalerate, $\alpha,\alpha'$-azodiisobuyramide, etc. The polymerization catalysts are employed in concentrations which have been previously found to promote polymerization reactions, i. e., in concentrations of from, say, 0.1 to 5.0 per cent by weight of the monomeric material.

The invention is further illustrated, but not limited, by the following examples:

Example 1

A mixture of 5.32 g. of N-vinyl-2-pyrrolidone and 4.68 g. of maleic anhydride was dissolved in 50 g. of benzene and 0.05 g. of azo-bis-isobutyronitrile was added as catalyst. The resulting solution was then agitated, in a nitrogen atmosphere, at a temperature of 60° C. for a period of 48 hours. At the end of that time the reaction mixture, comprising a suspension of solid, was filtered, and the resulting precipitate was dried to give 8.4 g. of a brownish powder having a softening point of 226° C. Analysis of this product gave a nitrogen content of 6.50% showing the presence of approximately 50% of copolymerized N-vinyl-2-pyrrolidone. Very small quantities of the copolymer may be incorporated into clay or silty loams for increasing aggregation thereof and effecting porosity of structure.

*Example 2*

Maleic anhydride (4.5 g.), N-vinyl-2-piperidone (5.5 g.), benzene (50 g.) and 0.10 g. of azo-bis-isobutyronitrile as catalyst were charged to a reaction vessel. The vessel was swept out with nitrogen and sealed, and then placed on a rotating rack, and maintained thereon at 43 R. P. M. for a time of 24 hours at a temperature of 60° C. The reaction mixture was then filtered and the resulting precipitate was dried to give a friable dark solid having a softening point of 187.5° C. Analysis of this product gave a nitrogen content of 6.01%, showing the presence of approximately 50% copolymerized N-vinyl-2-piperidone.

In place of N-vinyl-2-pyrrolidone or N-vinyl-2-piperidone or in addition thereto, other N-vinyl lactams, e. g., N-vinyl-6-caprolactam or N-vinyl-5-methyl-2-pyrrolidone may be copolymerized with maleic anhydride to yield copolymers having valuable soil-improving properties.

The present maleic anhydride-N-vinyl lactam heteropolymers may be modified, e. g., by reacting the anhydride radicals thereof with compounds which are known to react therewith. Thus the heteropolymers may be condensed with alkylamines or ammonia to yield polymeric materials having maleamic acid units which may be used as water-repellants for textiles, or they may be hydrolyzed and converted to inorganic salts, i. e., sodium, calcium or magnesium salts to yield polymeric products which may find applications as textile-sizes.

What we claim is:

1. A heteropolymer of maleic anhydride and an N-vinyl lactam.

2. A heteropolymer of maleic anhydride and N-vinyl-2-pyrrolidone, in which the said reactants are combined in substantially equimolar amounts.

3. A heteropolymer of maleic anhydride and N-vinyl-2-piperidone, in which the said reactants are combined in substantially equimolar amounts.

References Cited in the file of this patent

UNITED STATES PATENTS

| Number | Name | Date |
|---|---|---|
| 2,047,398 | Voss et al. | July 14, 1936 |
| 2,335,454 | Schuster et al. | Nov. 30, 1943 |
| 2,471,959 | Hunt | May 31, 1949 |
| 2,497,705 | Werntz | Feb. 14, 1950 |
| 2,566,250 | Reynolds et al. | Aug. 28, 1951 |